United States Patent
van Hoff et al.

(10) Patent No.: US 9,372,878 B2
(45) Date of Patent: Jun. 21, 2016

(54) ANALYZING SOCIAL PROXIMITY OF USERS OF A DIGITAL MAGAZINE SERVER

(71) Applicant: Flipboard, Inc., Palo Alto, CA (US)

(72) Inventors: Arthur Anthonie van Hoff, Menlo Park, CA (US); Markus Manfred Breunig, Rosenheim (DE)

(73) Assignee: Flipboard, Inc., Palo Alto, CA (US)

( * ) Notice: Subject to any disclaimer, the term of this patent is extended or adjusted under 35 U.S.C. 154(b) by 264 days.

(21) Appl. No.: 14/024,482

(22) Filed: Sep. 11, 2013

(65) Prior Publication Data

US 2014/0074934 A1    Mar. 13, 2014

Related U.S. Application Data (60) Provisional application No. 61/700,308, filed on Sep. 12, 2012, provisional application No. 61/752,952, filed on Jan. 15, 2013.

(51) Int. Cl.
    *G06F 15/16*     (2006.01)
    *G06F 17/30*     (2006.01)
    *H04L 29/06*     (2006.01)
    *G06Q 50/00*     (2012.01)

(52) U.S. Cl.
    CPC ...... *G06F 17/30324* (2013.01); *G06F 17/3053* (2013.01); *G06F 17/30648* (2013.01); *G06F 17/30867* (2013.01); *H04L 65/40* (2013.01); *G06Q 50/01* (2013.01)

(58) Field of Classification Search
    CPC .......... G06F 17/3053; G06F 17/30867; G06F 17/30648; G06F 17/30324; H04L 65/40; G06Q 50/01
    See application file for complete search history.

(56) References Cited

U.S. PATENT DOCUMENTS

| | | | |
|---|---|---|---|
| 8,478,735 B1 * | 7/2013 | Archambault .... | G06F 17/30864 707/711 |
| 8,667,393 B2 | 3/2014 | Gerwin | |
| 8,700,987 B2 | 4/2014 | Spalink | |
| 8,788,487 B2 | 7/2014 | Stout et al. | |
| 8,826,169 B1 | 9/2014 | Yacoub et al. | |

(Continued)

FOREIGN PATENT DOCUMENTS

WO    WO 2010/132491 A2    11/2010

OTHER PUBLICATIONS

PCT International Search Report and Written Opinion for PCT/US2013/059302, Jan. 28, 2014, 11 Pages.

(Continued)

*Primary Examiner* — Jonathan Bui
(74) *Attorney, Agent, or Firm* — Fenwick & West LLP (57) ABSTRACT

Connections between an online system user and one or more social networking system users maintained by various social networking systems are analyzed to determine social proximity between the online system user and social networking system users connected to the online system user via a social networking system. Social networking system users connected to the online system user via each of a plurality of social networking systems are identified. Based on a number of social networking system users connected to both the online system user and to a social networking system user connected to the online system user, a social proximity score indicating relative social "closeness" of the digital magazine server user and the social networking system user connected to the digital magazine server user is generated.

20 Claims, 4 Drawing Sheets

(56) References Cited

U.S. PATENT DOCUMENTS

| | | |
|---|---|---|
| 2002/0124050 A1 | 9/2002 | Middeljans |
| 2003/0004983 A1 | 1/2003 | Cohen |
| 2005/0033657 A1 | 2/2005 | Herrington et al. |
| 2005/0105134 A1 | 5/2005 | Moneypenny et al. |
| 2006/0026182 A1 | 2/2006 | Takeda et al. |
| 2007/0011050 A1 | 1/2007 | Klopf et al. |
| 2007/0150368 A1 | 6/2007 | Arora et al. |
| 2008/0079972 A1 | 4/2008 | Goodwin et al. |
| 2008/0082903 A1 | 4/2008 | McCurdy et al. |
| 2008/0120670 A1 | 5/2008 | Easton et al. |
| 2009/0049374 A1 | 2/2009 | Echenberg |
| 2010/0049770 A1 | 2/2010 | Ismalon |
| 2010/0161369 A1* | 6/2010 | Farrell .................. G06Q 50/01 705/319 |
| 2010/0198828 A1 | 8/2010 | Petersen et al. |
| 2010/0274815 A1* | 10/2010 | Vanasco ........... G06F 17/30867 707/798 |
| 2010/0299642 A1 | 11/2010 | Merrell et al. |
| 2010/0306249 A1 | 12/2010 | Hill et al. |
| 2010/0318571 A1* | 12/2010 | Pearlman ............. H04L 63/104 707/784 |
| 2011/0047368 A1 | 2/2011 | Sundaramurthy et al. |
| 2011/0191321 A1 | 8/2011 | Gade et al. |
| 2011/0234613 A1 | 9/2011 | Hanson et al. |
| 2011/0238755 A1* | 9/2011 | Khan .................... G06Q 50/01 709/204 |
| 2011/0265011 A1 | 10/2011 | Taylor et al. |
| 2011/0296004 A1 | 12/2011 | Swahar |
| 2011/0302064 A1 | 12/2011 | Dunkeld et al. |
| 2012/0110678 A1 | 5/2012 | Kumble |
| 2012/0158476 A1* | 6/2012 | Neystadt ............... G06Q 50/01 705/14.16 |
| 2012/0158751 A1 | 6/2012 | Tseng |
| 2012/0179572 A1 | 7/2012 | Hesse |
| 2012/0192093 A1 | 7/2012 | Migos et al. |
| 2012/0203640 A1 | 8/2012 | Karmarkar et al. |
| 2012/0221555 A1 | 8/2012 | Byrne et al. |
| 2012/0254188 A1 | 10/2012 | Koperski et al. |
| 2012/0297490 A1 | 11/2012 | Barraclough et al. |
| 2013/0226663 A1* | 8/2013 | Jahid .................. G06Q 10/1053 705/7.32 |
| 2013/0290414 A1* | 10/2013 | Rait ..................... G06Q 50/01 709/204 |
| 2014/0067825 A1 | 3/2014 | Oztaskent et al. |
| 2014/0075296 A1 | 3/2014 | Schaad et al. |
| 2015/0127565 A1* | 5/2015 | Chevalier ............. G06Q 10/00 705/319 |

OTHER PUBLICATIONS

PCT International Search Report and Written Opinion for PCT/US2013/059297, Jan. 28, 2014, 15 Pages.
PCT International Search Report and Written Opinion for PCT/US2013/059298, Jan. 28, 2014, 15 Pages.
PCT International Search Report and Written Opinion for PCT/US2013/059300, Mar. 19, 2014, 14 Pages.

* cited by examiner

ANALYZING SOCIAL PROXIMITY OF USERS OF A DIGITAL MAGAZINE SERVER

CROSS REFERENCE TO RELATED APPLICATIONS

This application claims the benefit of U.S. Provisional Application No. 61/700,308, filed Sep. 12, 2012, and U.S. Provisional Application No. 61/752,952, filed Jan. 15, 2013, each of which is incorporated by reference in their entirety.

BACKGROUND

This invention relates generally to online systems, and more specifically to determining social proximity between users of an online system.

An online system offering content for consumption by their users often recommends content items to its users to keep the users engaged with the online system. For example, an online system identifies content items to recommend to users based on a content item's popularity or the content item's similarity to content items with which a user previously interacted. However, a content item that is popular among some online system users may not be interesting to another online system user because the user does not share common interests with the online system users with which the content item is popular. Accordingly, determining which content items to recommend to a user based merely on the popularity of content items across an online system's entire user base often results in recommending content items to users who are not interested in the recommended items.

SUMMARY

An online system determines social proximity of its users to each other based on connections between an online system user and additional users of each of a plurality of social networking systems. In a social networking system, a user may have a connection to one or more additional users. The online system communicates with a plurality of social networking systems to retrieve information maintained by various social networking systems describing connections between a user and additional users of one or more social networking systems. To determine social proximity between a user of the online system and a social networking system user connected to the user of the online system via a social networking system, the online system accesses profiles of the user of the online system from each of the social networking systems and identifies users of each social networking system connected to the user based on information maintained by the various social networking systems. A set of additional users of social networking systems connected to both the user of the online system and to an identified user of a social networking system connected to the user of the online system are identified from the information maintained by the plurality of social networking systems. Based on the number of additional users of one or more social networking system users connected to the user of the online system and connected to the identified user of the social networking system connected to the user of the online system, as well as additional information retrieved from the social networking system pertaining to the user of the online system, the online system generates a social proximity score indicating relative social "closeness" of the user and the identified user of the online system of the social networking system connected to the user of the online system. For example, the social proximity score is proportional to a fraction of the users of the plurality of social networking system users connected to the user of the online system and to the identified user of the social networking system connected to the user of the online system via one or more social networking systems.

In one embodiment, the online system generates social proximity scores by analyzing groups of users connected to each other in one or more social networking systems. The online system may calculate or define a distribution of social proximity scores for the groups of users connected to each other, and normalize the social proximity score between a user and an additional user connected to the user in the group to the distribution of social proximity scores for the group. The online system may additionally or alternatively use other characteristics of connection between the user and an additional user via a social networking system, such as directionality of the connection between the user and the additional user in the social networking system.

The online system may use the social proximity scores between various online system users to recommend content items to its users. In one embodiment, two users with at least a threshold social proximity score to each other are determined to share common interests, so the online system accounts for the social proximity score when recommending content items to one of the users. For example, if two users have at least a threshold social proximity score to each other, content items that one of the users interacted with or viewed are recommended to the other user.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server determines social proximities between various users of the online system based on users of social networking systems connected to the users of the online system via the one or more social networking systems connections between the users and additional users of the social networking systems. For purposes of illustration, example embodiments of determining social proximity are described herein with respect to a digital magazine server.

However, other embodiments may be implemented by other online systems, such as social networking systems or online content providers.

In one embodiment, the digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
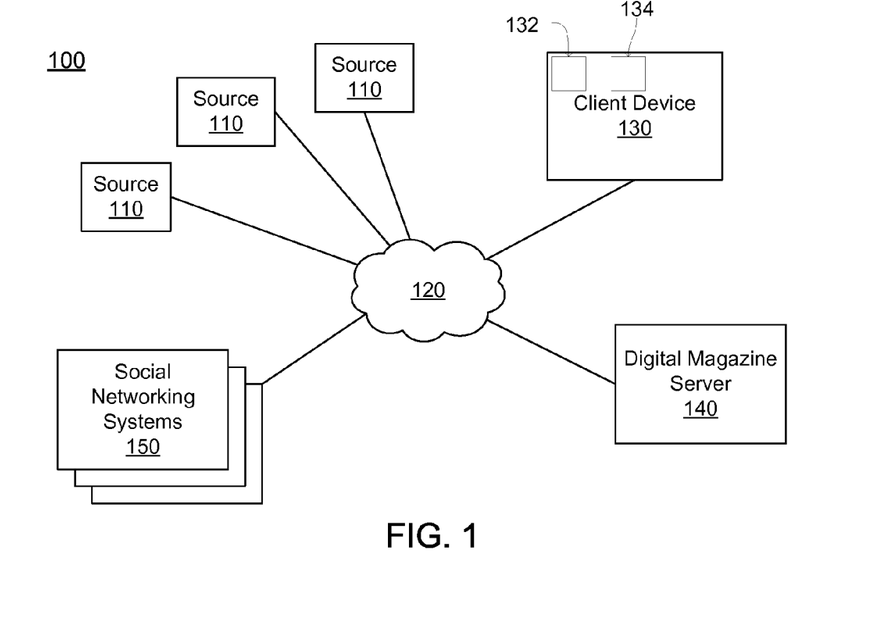
FIG. 1 is a block diagram of a system environment in which a digital magazine server operates, in accordance with an embodiment of the invention.

FIG. 1 is a block diagram of a system environment 100 for determining social proximity between users of an online system, according to one embodiment. The system environment 100 shown by FIG. 1 comprises one or more sources 110, a network 120, a client device 130, a digital magazine server 140, and one or more social networking systems 150. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 110 is a conventional computer system, such as a desktop or a laptop computer. Alternatively, the client device 130 may be a device having computer functionality, such as a personal digital assistant (PDA), a mobile telephone, a smartphone, a tablet computer, or another suitable device. In one embodiment, the client device 130 executes an application allowing a user of the client device 110 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 110, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

A social networking system 150 is a computing system allowing its users to communicate, or otherwise interact, with each other. Additionally, a social networking system 150 allows its users to establish connections with other users of the social networking system 150. Connections between users of a social networking systems 150 may be unidirectional (e.g., user A connects to user B, but user B does not necessarily connect to user A) or bidirectional (e.g., users A and B are connected if both user A and user B authorize the connection). When a first user is connected to a second user by a unidirectional connection, the first user can view content posted by the second user in the social networking system 150. When two users are connected by a bidirectional connection, each user can view content posted by the other.

Each social networking system 150 maintains user profiles describing each of its users. Examples of information stored in a user profile include demographic data (e.g., gender information), biographic data (e.g., interest information), actions taken by the users involving other users or content maintained by the social networking system 150, and additional users of a social networking system connected to a social networking system 150 user described by the user profile. In one embodiment, the user profile also identifies groups of additional users of the social networking system 150 connected to a user. A social networking system 150 may allow a user to form logical groups of additional users of the social networking system 150 connected to the user. A user may assign a subset of the users connected to the user to groups to organize the additional users connected to the user or to prioritize presentation of content from additional users connected to the user. For example, a user assigns additional users connected to the user via a social networking system 150 to groups of family, friends, coworkers, or classmates, based on the relationship between the user and the additional users. Each additional user connected to a user of a social networking system 150 may be assigned to zero, one, or more groups within each social networking system 150.

In another embodiment, a social networking system 150 enables users to join groups that represent virtual communities of users within the social networking system 150. For example, users join groups for an event attended by the users, for a common interest of the users, or for communities outside of the social networking system 150 (such as a group of coworkers, classmates, or members of an organization). Members of a group may communicate with each other through, for example, a forum provided by the social networking system 150 for the group. A user may or may not be connected to the other members of a group. In yet another embodiment, a social networking system 150 may automatically assign a subset of additional users connected to the user via the social networking system 150 to a group based on a common characteristic or attribute of the user and the additional users connected to the user. For example, a social networking system 150 generates a group including the user's coworkers or classmates based on work or education history in the user's user profile and in the user profiles of the additional users connected to the user.

Users interact with content, such as pages, presented by one or more social networking systems 150 via the client device 130. In one embodiment, the social networking systems 150 serve as sources 110 for content of the digital magazines served by the digital magazine server 140. A user of the digital magazine server 140 and one or more social networking systems 150 may provide the digital magazine server 140 with the user's authentication information (e.g., login credentials) for accessing one or more of the social networking systems 150 that maintain a user profile for the user. Using the authentication information, the digital magazine server 140 accesses one or more of the social networking systems 150 and retrieves content for presentation to the digital magazine server user in a format similar to print magazines, for example.

Figure 2:
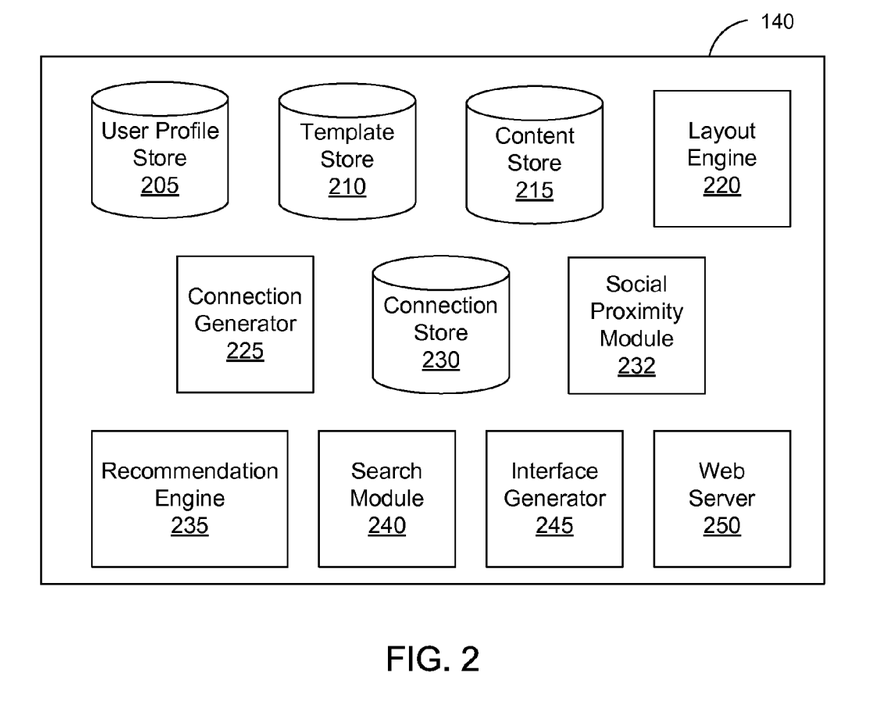
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a social proximity module 232, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding digital magazine server 140 user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred. Interactions with the content items may include, for example, viewing or reading the content item, saving the content item to a favorites collection, providing explicit positive or negative feedback about the content item, or sharing the content item with one or more connections in the digital magazine server 140 or in a social networking system 150.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

The content store 215 stores objects that each represents various types of content. For example, the content store 215 stores content items received from one or more sources 110 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187,840, filed on Jul. 21, 2011, which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine sever 140. For example, the connection generator 225 identifies when users of the digital magazine system 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items; for example, the connection generator 225 identifies user interactions with a content item within a specified time interval or applies a decay factor to identified user interactions based on a time associated with an interaction. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. An example method for determining social proximity is further described below in conjunction with FIG. 5. For example, the digital magazine server 140 analyzes additional users connected to each of two users of the digital magazine server 140 within one or more social networking systems 150 to determine the social proximity of the two users. In another example, the digital magazine server 140 determines social proximity between a first and a second user by analyzing the first user's interactions with content items posted by the second user, whether the content item is posted using the digital magazine server 140 or on another social networking system 150. Additional examples for determining social proximity between users of the digital magazine server 140 are described in U.S. patent application Ser. No. 13/905,016, filed on May 29, 2013, which is hereby incorporated by reference in its entirety.

In one embodiment, the connection generator 225 determines a connection confidence value between a user and an additional user of the digital magazine server 140 based on the user's and the additional user's interactions with content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

The social proximity module 232 determines social proximity between users of the digital magazine server 140. In one embodiment, the social proximity module 232 analyzes information retrieved from various social networking systems 150 to determine the social proximity of a user of the digital magazine server 140 to social networking system users connected to the user of the digital magazine server via one or more social networking systems 150. In another embodiment, the social proximity module 232 analyzes inferred connections between users of the digital magazine server 140 (e.g., as generated by the connection generator 225 and stored in the connection store 230) to determine social proximity between users of the digital magazine server 140. Based on a number of users of one or more social networking systems 150 connected to a digital magazine server user via the one or more social networking systems 150 and to an additional user connected to the digital magazine server via a social networking system 150, the social proximity module 232 generates a social proximity score between the digital magazine server user and the additional user connected to the digital magazine server user via the social networking system 150. The social proximity score represents the relative "closeness" of the digital magazine server user via the social networking system 150. For example, a social proximity score having at least a threshold value indicates that two users are very close socially, such as family or close friends. A low social proximity score below a minimum threshold value indicates that two users are not socially close, such as one-time acquaintances or users who have never met. The social proximity module 232 may also use information, other than a number of social networking system users connected to the digital magazine server user and an additional user connected to the digital magazine server via a social networking system 150, maintained by one or more social networking system 150 describing a connection between the digital magazine server user via a social networking system 150 to generate the social proximity score, such as a number of social networks in which the users are connected, the directionality of the connection between the digital magazine server user and the additional user of a social networking system 150 connected to the digital magazine server user via a social networking system 150, or groups maintained by one or more social networking system networks 150 including the digital magazine server user and the additional user of a social networking system 150. The social proximity module 232 is described below with respect to FIG. 4.

Using the social proximity score generated by the social proximity module 232 and data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, connections between users from the connection store 230, and/or social proximity scores between the users generated by the social proximity module 232. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold social proximity score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, social proximity scores between the connections and the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking. One or more factors associated with the content items may be used to generate the ranking Examples of factors include: global popularity of a content item among users of the digital magazine server 140, connections between users interacting with a content item and the user providing the search query, social proximity of the user providing the search query to the user's connections, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, the social proximity module 232 may be a module executed by the digital magazine server 140, by a client device 130, or by a combination of the digital magazine server 140 and the client device 130. In yet another embodiment, the social proximity module 232 may be executed by a social networking system 150 or by an online system other than the digital magazine server 140.

Page Templates

Figure 3:
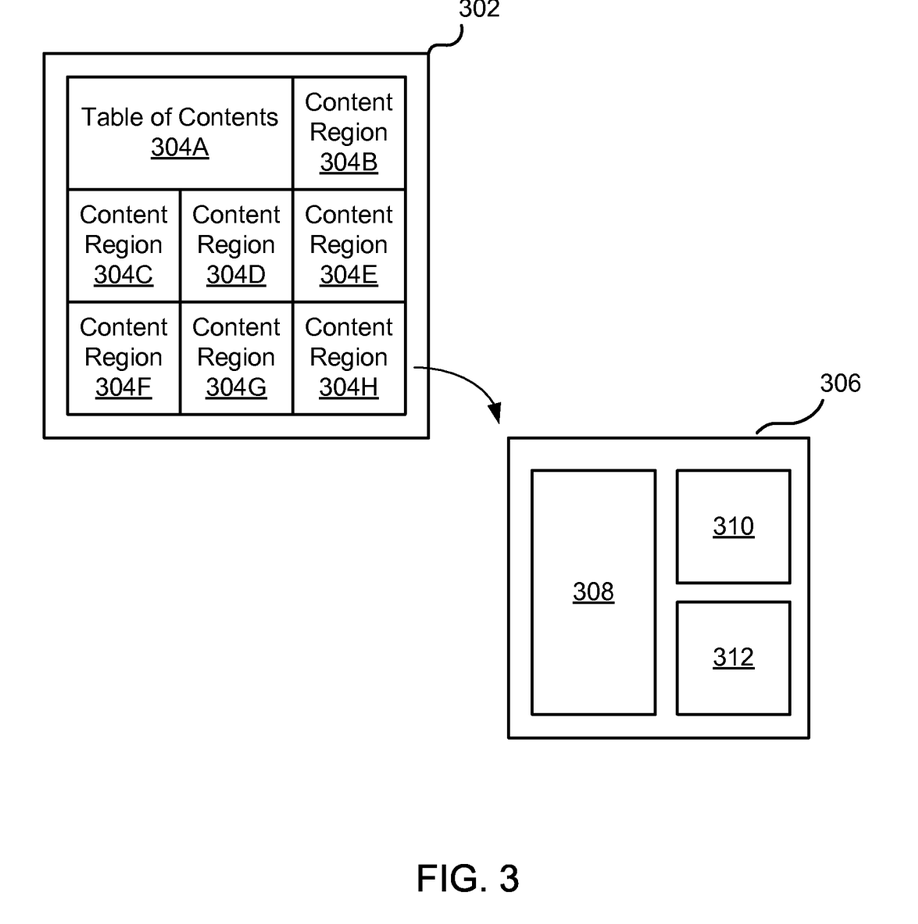
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 302 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Generating Social Proximity Scores

Figure 4:
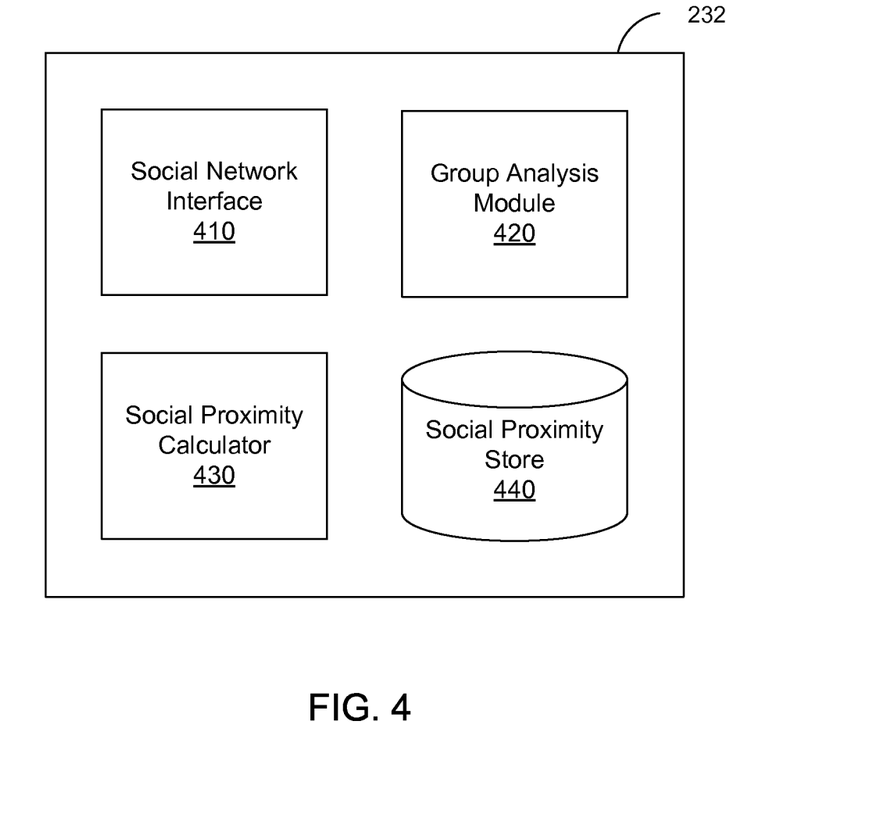
FIG. 4 is a block diagram of an architecture of a social proximity module, according to one embodiment.

FIG. 4 is a block diagram of an architecture of one embodiment of the social proximity module 232. In the example shown by FIG. 4, the social proximity module 232 shown in FIG. 4 includes a social network interface 410, a group analysis module 420, a social proximity calculator 430, and a social proximity store 440. In other embodiments, the social proximity module 232 may include additional, fewer, or different components than those shown in FIG. 4 for various applications.

The social network interface 410 retrieves information from one or more social networking systems 150 describing a user of the digital magazine server 140 that maintains a user profile on the one or more social networking systems 150. For example, the social network interface 410 retrieves information from one or more social networking systems 150 identifying additional users of a social networking system 150 connected to the user of the digital magazine server 140, and may retrieve additional information describing the user of the digital magazine server 140 (e.g., demographic information, actions performed by the user of the digital magazine server 140 and maintained by the social networking system 150, etc.). The social network interface 410 may access information from the social networking systems 150 on a periodic basis, such as once per day. The social network interface 410 accesses the social networking systems 150 using social networking authentication information associated with a user of the digital magazine server 140 access to a social networking system 150, such as username, email address, password, or other information suitable for providing the user of the digital magazine server 140 access to a social networking system 150.

In one embodiment, the social network interface 410 accesses social networking system information when a user of the digital magazine server 140 accesses a social networking system 150 from an interface in a generated digital magazine. In another embodiment, the social network interface 410 accesses social networking system information when the user sets up an account or user profile with the digital magazine server 140. A user of the digital magazine server 140 may access multiple social networking systems from 140 the interface in a generated digital magazine or otherwise provide the digital magazine server 140 with authentication credentials for accessing profiles associated with the user of the digital magazine server 140 and maintained by multiple social networking systems 150. Identifiers of the user's user profiles in each of the social networking systems 150 may be stored in the user profile maintained by the digital magazine server 140 for the user of the digital magazine server 140. Accordingly, the social network interface 410 may identify several user profiles maintained by multiple social networking systems 150 associated with a single user of the digital magazine server 140, and retrieve social network information from each of the user profiles maintained by the various social networking systems 150. In another embodiment, the social network interface 410 accesses social networking system information without the user of the digital magazine server 140 explicitly providing social networking authentication information to the digital magazine server 140.

Information retrieved by the social network interface 410 from each social networking system 150 includes information identifying additional users of each of the social networking systems 150 connected to the user of the digital magazine server 150 through a social networking system 150. If the user of the digital magazine server 140 has grouped additional social networking system users connected to the user of the digital magazine server 140 into one or more groups in a social networking system 150, the names of the groups and social networking system users in each group may be identified by the information retrieved from a social networking system 150. In one embodiment, the information retrieved from a social networking system 150 may also include a set of users of the social networking system 150 connected to both the user of the digital magazine server 140 and to each additional user of the social networking system 150 that is connected to the user of the digital magazine server 140 through the social networking system 140. The social network interface 410 may retrieve the set of social networking system users connected to a digital magazine server user and to an additional user of a social networking system connected to the digital magazine server user, may retrieve a number of common social networking system users connected to a digital magazine server user and to an additional user of a social networking system connected to the digital magazine server user, or may identify the number of social networking system users connected to a digital magazine server user and to an additional user of a social networking system connected to the digital magazine server user based on user profiles maintained by a social networking system 150 for the digital magazine server user and for the additional social networking system user connected to the digital magazine server user via the social networking system 150. In some embodiments, additional information retrieved from the one or more social networking systems 150 includes actions by the digital magazine server user on each social network 150 (e.g., posting content, viewing content posted by other users, sharing content with connections, or providing explicit positive or negative feedback for content). In one embodiment, the social network interface 410 retrieves the information from various social networking systems 150 by executing a call provided by an application programming interface (API) associated with each of the social networking systems 150.

The group analysis module 420 analyzes groups of additional social networking system users connected to a digital magazine server user via one or more social networking systems 150. As described above, a subset of social networking system users connected to the digital magazine server user via a social networking system 150 may be assigned to one or more groups in the social networking system 150, by the user, by the social networking systems 150, or by the choice of the social networking system users to join a group. For each user of the digital magazine server 140, the group analysis module 420 analyzes groups maintained by various social networking systems 150 including the digital magazine server user.

For example, the group analysis module 420 identifies social networking system users connected to a digital magazine server user via a social networking system user 150 that are assigned to a group. In one embodiment, the group analysis module 420 classifies the groups by their names. Group names may indicate relative social proximity of the social networking system users in the groups to each other. For example, groups named "friends," "amigos," "buddies," "mates," "amici," "interesting people," "freunde," "vrienden," or the like may indicate that the social networking system users included in the group have a moderately high social proximity to the digital magazine server user included in the group; the group analysis module 420 may assign these groups, and the social networking system users in these groups, to a "medium" social proximity group class. Groups named "best friends," "inner circle," "top," "fays," "favorites," "close," or the like may indicate that the social networking system users included in the group have a relatively higher social proximity to the digital magazine server user included in the group; the group analysis module 420 may assign the social networking system users in these groups to a "high" social proximity group class. Groups named "family," "relatives," "conocidos," "conhecidos," "familia," "familie," or the like may indicate the highest social proximity between the digital magazine server user and each of the social networking system users in the group. In one embodiment, the group analysis module 420 assigns social networking system users in these groups to a "highest" social proximity group class. The group analysis module 420 may assign social networking system users in another group including the digital magazine server user to an "unknown" social proximity group class if, for example, the name of the group does not indicate a relative social proximity of the social networking system users included in the group to the digital magazine server user in the group.

The social proximity calculator 430 generates a score indicating the social proximity of a digital magazine server user and a social networking system user connected to the digital magazine server user via a social networking system 150. As described above, the social proximity score is a representation of the relative "closeness" of a digital magazine server user and a social networking system user connected to the digital magazine server user via a social networking system 150 to each other. A high social proximity score (e.g., a social proximity score exceeding a threshold value) indicates that the digital magazine server user and a social networking system user connected to the digital magazine server user are very close and a low social proximity score (e.g., a social proximity score less than a minimum threshold value) indicates that the digital magazine server user and a social networking system user connected to the digital magazine server user are not socially close. In one embodiment, the social proximity score is a number between 0 and 1000, where 0 indicates that the users are not socially close (e.g., the users have never met) and 1000 indicates that the users are very socially close (e.g., the users are family members). However, in other embodiments, the social proximity score may have any suitable range of values.

In one embodiment, for each user U of the digital magazine server 140, the social proximity calculator 430 generates the social proximity score between the user U and a social networking system user C connected to the digital magazine server user via a social networking system 150 based on the number of additional social networking system users connected to both digital magazine server user U and to social networking system user C. In one embodiment, if social networking system user C is not a user of the digital magazine server 140, the social proximity calculator 430 generates a score sp(U,C) representing the social proximity between the digital magazine server U and the social networking system user C connected to the digital magazine server user U via the social networking system 150 by the equation:

$$sp(U,C) = |common(U,C)|/|conn(U)| \tag{1}$$

where |common(U,C)| is the number of social networking system users of a social networking system 150 connected to both the digital magazine server U and the social networking system user C connected to the digital magazine server user U via the social networking system 150, and |conn(U)| is the number of social networking system users connected to the digital magazine server user U in the social networking system 150. Thus, the social proximity between the digital magazine server U and the social networking system user C connected to the digital magazine server user U according to equation (1) represents a fraction of the social networking system users of the social networking system 150 connected to the digital magazine server user U that are connected to both the digital magazine server user U and the social networking system user C connected to the digital magazine server user U through the social networking system 150. The social proximity calculator 430 may normalize the social proximity scores for the digital magazine server user U to a predefined range, such as 0-1000.

If the social networking system user C connected to the digital magazine server U by the social networking system 150 is also a user of the digital magazine server 140, the social proximity calculator 430, in one embodiment, generates the social proximity score sp(U,C) by the equation:

$$sp(U,C) = \alpha * |common(U,C)|/(\beta * |conn(U)| + (1-\beta)*|conn(C)|) \quad (2)$$

where |common(U,C)| is the number of users of the social networking system 150 connected to the digital magazine server user U and connected to the social networking system user C connected to the digital magazine server U through the social networking system 150, |conn(U)| is the number of social networking system users connected to the digital magazine server user U via the social network, and |conn(C)| is the number of connections of the social networking system user C connected to the digital magazine server user U via the social networking system 150. The weights α and β may be heuristically determined. For example, a may be a value greater than one (e.g., 1.2) such that the social proximity score between the digital magazine server U and the social networking system user C connected to the digital magazine server user U through the social networking system 150 is higher when social networking system users connected to the digital magazine server user U and connected to the social networking system user C connected to the digital magazine server user U are both known than when only the social networking system users connected to the digital magazine server user U via the social networking system 150 are known. The weight β may have a value between zero and one, inclusive (e.g., 0.9). Thus, the social proximity score between the digital magazine server U and the social networking system user C connected to the digital magazine server user U through the social networking system 150 according to equation (2) uses a weighted average of the number of respective social networking system users connected to digital magazine server user U and connected to social networking system user C connected to digital magazine server user U, and represents a fraction of the average number of social networking system users connected to both the digital magazine server U and the social networking system user C connected to the digital magazine server user U through the social networking system 150. The social proximity calculator 430 may normalize the social proximity scores for the digital magazine server user U to a predefined range, such as 0-1000.

The social proximity calculator 430 may alternatively use other methods for generating the social proximity score between a digital magazine server user and a social networking system user connected to the digital magazine server user through the social networking system 150 based on the number of social networking system users connected to the digital magazine server user and to the social networking system user connected to the digital magazine server user. For example, the social proximity calculator 430 may divide the number of social networking system users connected to both the digital magazine server user U and to the social networking system user C connected to the digital magazine server user U via a social networking system 150 by the number of social networking system users connected to the social networking system user C connected to the digital magazine server user U. Hence, the social proximity score represents the fraction of social networking system users connected to the social networking system user C connected to the digital magazine server user U that are common to the digital magazine server user U and to the social networking system user C connected to the digital magazine server user U.

In one embodiment, the social proximity calculator 430 aggregates connections between users via multiple social networks to generate the social proximity score. For example, the social proximity calculator 430 calculates the social proximity score using equations (1) or (2), in which |common(U, C)| represents the number of users of multiple social networking systems 150 connected to both the digital magazine server user U and to a social networking system user connected to the digital magazine server user C via a social networking system 150. In this example, |conn(U)| and |conn(C)| represent, respectively, the number of unique social networking system users connected to of the digital magazine server user U and connected to the social networking system user C connected to the digital magazine server user U in each of the social networking systems 150.

As another example, the social proximity calculator 430 generates a social proximity score between the digital magazine server user U and a social networking system user C connected to the digital magazine server user U via a social networking system 150 for each of a plurality of social networks, and generates an overall social proximity score by combining the individual social proximity scores (for example, by calculating a weighted average of the individual social networking system 150 social proximity scores). By aggregating connections from multiple social networking systems 150 to generate the social proximity score, the social proximity calculator 430 may generate a social proximity score that more accurately represents the social proximity of the digital magazine server user to the social networking system user connected to the digital magazine server user. For example, if a digital magazine server user uses several social networking systems 150, the digital magazine server user may be connected to a different set of social networking system users via each social networking system 150. Accordingly, social networking system users connected to the digital magazine server user via a single social networking system may be only a subset of the users of various social networking systems 150 connected to the digital magazine server user. Identifying users of various social networking systems 150 connected to both the digital magazine server user and to a social networking system user 150 connected to the digital magazine server user across several social networking systems 150 allows the social proximity calculator 430 to account for a larger number of social networking system users connected to the digital magazine server user when generating the social proximity score.

In one embodiment, the social proximity calculator 430 adjusts the generated social proximity scores based on other characteristics of a connection between a digital magazine server user and a social networking system user connected to the digital magazine server user. In one embodiment, the social proximity calculator 430 adjusts the social proximity score based on directionalities of the connection between the digital magazine server user and social networking system users connected to the digital magazine server user via a social networking system 150. For example, if the digital magazine server user U and the social networking system user C connected to the digital magazine server user U are both connected to one another in a social network, the relative social proximity of the digital magazine server user U and the social networking system user C connected to the digital magazine server user U may be greater than the relative social proximity of the digital magazine server user U and the social networking system user C connected to the digital magazine server user U when the digital magazine server user U is connected to the social networking system user C connected to the digital magazine server user U but the social networking system user C is not connected to the digital magazine server user U. Accordingly, the social proximity calculator 430 may adjust the social proximity score to account for directionality of the connection between the digital magazine server user U and the social networking system user C connected to the digital magazine server user U. For example, the social proximity calculator 430 generates the social proximity score by the equation:

$$sp(U, C) = \begin{cases} \gamma |common(U, C)|/|conn(U)| & U \leftrightarrow C \\ |common(U, C)|/|conn(U)| & U \to C \end{cases} \quad (3)$$

where $\gamma>1$, $U \leftrightarrow C$ indicates a bidirectional connection between the digital magazine server user U and the social networking system user C, and $U \to C$ indicates a unidirectional connection between the digital magazine server user U and the social networking system user C. Alternatively, the social proximity calculator 430 may add a fixed value (e.g., 100) to the social proximity score if the connection is bidirectional, but not add the fixed value if the connection is unidirectional. As another alternative, the social proximity calculator 430 may generate adjusted social proximity scores between a bidirectionally connected digital magazine server user and a social networking system user connected to the digital magazine server so the adjusted social proximity scores of the user and connection are equivalent. For example, because the digital magazine server user U and the social networking system user C connected to the digital magazine server user U may have a different number of connections in a social network, sp(U,C) may not be equivalent to sp(C,U). If the digital magazine server user U and the social networking system user C connected to the digital magazine server user U are connected by a bidirectional connection, the social proximity calculator 430 may generate an adjusted social proximity score between the digital magazine server user U and the social networking system user C connected to the digital magazine server user U asp(U,C) based on the social proximity scores sp(U,C) and sp(C,U), such that asp(U,C)= asp (C,U)=average {sp(U,C), sp(C,U)}.

In another embodiment, the social proximity calculator 430 adjusts the social proximity score between a digital magazine server user U and each social networking system user C connected to the digital magazine server user U based on groups including the social networking system users C in one or more social networking systems 150. For example, if a subset G of social networking system users C connected to the digital magazine server user U are in a group, the social proximity calculator 430 may analyze the group to generate a social proximity score between the user U and each social networking system user C connected to the digital magazine server user U in the subset G. In one embodiment, the social proximity calculator 430 generates the social proximity score between a digital magazine server user U and a social networking system user C connected to the digital magazine server user U based on, for example, equations (1), (2), or (3) above, and increasing the score if the social networking system user C connected to the digital magazine server user U is part of a subset G. For example, the social proximity calculator 430 may add a fixed value (e.g., 50) to the social proximity score between digital magazine server user U and a social networking system user C connected to the digital magazine server user U if the digital magazine server user U included the social networking system user C in a group in one or more social networking systems 150. Alternatively, the social proximity calculator 430 may multiply the social proximity score determined by equation (1), (2), or (3) by a scaling factor (e.g., 1.2) if the digital magazine server user U included the social networking system user C in a group in one or more social networking systems 150.

In another embodiment, the social proximity calculator 430 analyzes the name of the group to adjust the social proximity between the digital magazine server user U and each social networking system user connected to the digital magazine server user U in the subset G. For each class of group names generated by the group analysis module 420, the social proximity calculator 430 defines parameters of the social proximity scores in the group. In one embodiment, the social proximity calculator 430 defines a mean, an upper bound, a lower bound, and a standard deviation for the social proximity scores of the social networking system users connected to the digital magazine server user in each group. For example, if the social proximity scores are on a scale from zero to 1000, the social proximity calculator 430 may use the following parameters for each group class:

| Group Class | Mean | Standard Deviation | Upper Bound | Lower Bound |
|---|---|---|---|---|
| Highest | 900 | 100 | 1000 | 800 |
| High | 800 | 100 | 1000 | 700 |
| Medium | 400 | 200 | 700 | 0 |
| Unknown | Calculated | max (100, calculated) | 1000 | 0 |

In this example, the group class "highest" represents groups having names indicating the closest social proximity (e.g., "family"), the class "high" represents groups having names indicating close social proximity (e.g., "best friends"), the class "medium" represents groups having names indicating moderate social proximity (e.g., "friends"), and the class "unknown" represents groups having unclassified names. The mean and standard deviation for the group class "unknown" may be calculated based on initial social proximity scores calculated for the social networking system users connected to the digital magazine server user in the corresponding groups by, for example, equations (1) or (2) above.

The social proximity calculator 430 may adjust social proximity scores based on a determination that the social proximities are similar between the digital magazine server user U and each social networking system users C connected to the digital magazine server user U in the subset G. When generating a social proximity score for each social networking system user C connected to the digital magazine server U, the social proximity calculator 430 may generate an initial score using equations (1) or (2) above, for example, then normalize the initial scores to the parameters of the class of the group including a social networking system user C connected to the digital magazine server user U.

The social proximity calculator 430 stores the generated and/or adjusted social proximity scores in the social proximity store 440 in association with an identifier of the digital magazine server user and an identifier of the social networking system user connected to the digital magazine server user. The social proximity calculator 430 may use any combination of the factors described above to generate the social proximity score between a digital magazine server user and a social networking system user connected to the digital magazine server via a social networking system 150. In other embodiments, characteristics of a connection in a social networking system 150 between the digital magazine server user and a social networking system user may be used to generate and/or adjust the social proximity scores, such as the frequency of interaction between the digital magazine server user and a social networking system user connected to the digital magazine server user through a social networking system 150 or the digital magazine server 140.

Figure 5:
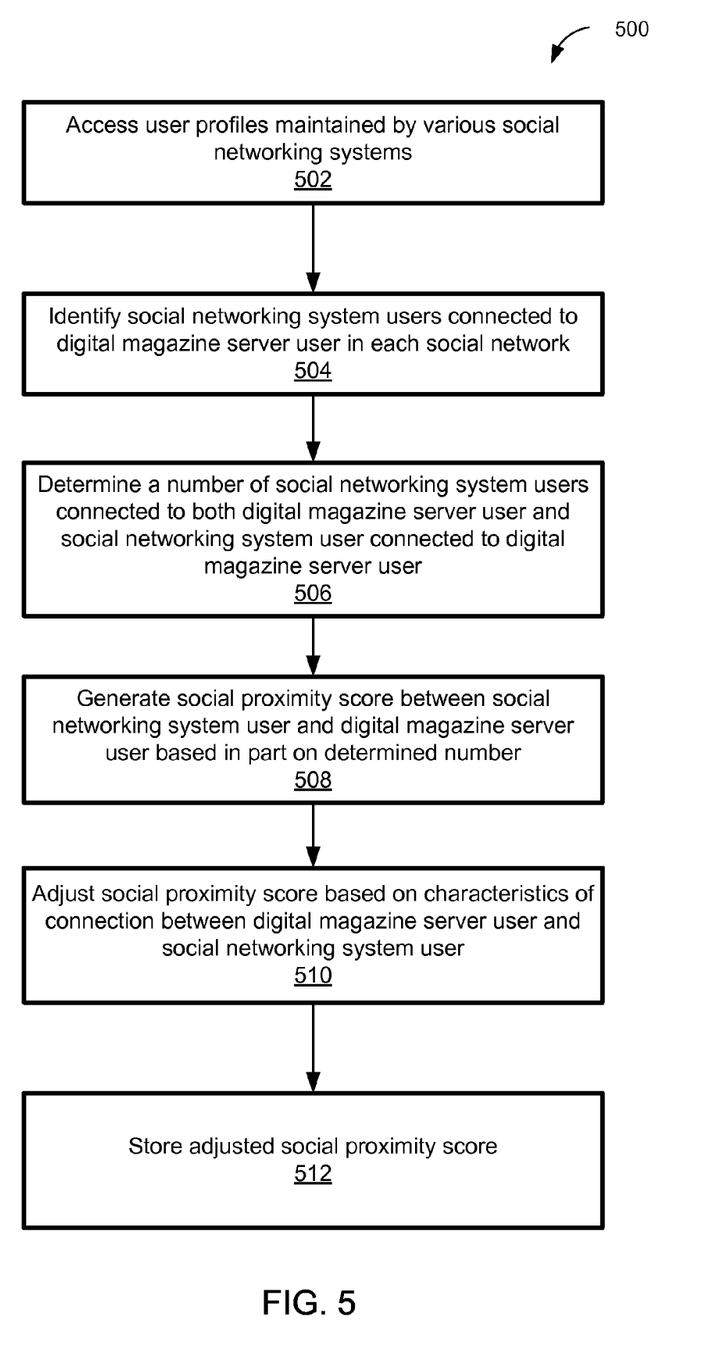
FIG. 5 is a flowchart illustrating a process for generating social proximity scores between users of an online system, according to one embodiment.

FIG. 5 is a flowchart illustrating one embodiment of a method 500 for generating social proximity scores between users of an online system. The steps of the method 500 may be performed by the social proximity module 232, or any other suitable component or combination of components. Other embodiments of the method 500 may include different or additional steps, and the steps may be performed in different orders.

In one embodiment, the social proximity module 232 generates a social proximity score between an online system user and each social networking system user connected to the online system user through the process illustrated in FIG. 500. Furthermore, the process 500 illustrated in FIG. 5 may be performed for each of a plurality of users of the digital magazine server 140. In one embodiment, the social proximity module 232 generates the social proximity scores on a periodic basis, such as once per day.

The social proximity module 232 accesses 502 user profiles maintained by one or more social networking systems 150 and associated with a user of the digital magazine server 140. The user profiles may be maintained by one or more social networking systems 150 or may be generated and stored by the digital magazine server 140. Based on the accessed user profiles, the social proximity module 232 identifies 504 one or more social networking system users connected to the user of the digital magazine server 140 via a social networking system 150. For example, the social proximity module 232 selects a social networking system 150 and identifies a user of the selected social networking system 150 connected to the user of the user of the digital magazine server 140.

For a social networking system user connected to the user of the digital magazine server 140 via a social networking system 150, the social proximity module 232 determines 506 a number of additional users of the social networking system 150 connected to the social networking system user and connected to the user of the digital magazine sever 140. The social proximity module 232 may determine 506 the number of additional users of the social networking system 150 connected to the social networking system user and connected to the user of the digital magazine sever 140 in a single social networking system 150, or may determine 506 an aggregated number of additional users connected to both the user of the digital magazine server 140 and to the social networking system user connected to the user of the digital magazine server 140 across two or more social networks.

Based on the number of additional users of the social networking system 150 connected to the social networking system user and connected to the user of the digital magazine sever 140, the social proximity module 232 generates 508 a social proximity score between the user of the digital magazine server 140 and the social networking system user connected to the user of the digital magazine server 140. The social proximity module 232 may adjust 510 the social proximity score based on other characteristics of the connection between the user of the digital magazine server 140 and the social networking system user connected to the user of the digital magazine server 140. For example, the social proximity module 232 may scale the social proximity score based on the number of social networking systems 150 in which the user of the digital magazine sever 140 is connected to the social networking system user, the directionality of the connection between the user of the digital magazine server 140 and the social networking system user, one or more groups including the social networking system user connected to the user of the digital magazine server 140, or types and frequency of interactions between the user of the digital magazine server 140 and the social networking system user connected to the user of the digital magazine server through the digital magazine server 140 or through one or more social networking systems 150. Alternatively, the social proximity module 232 may add to or subtract from the social proximity score based on the characteristics of the connection between the user of the digital magazine server 140 and the social networking system user.

The social proximity module 232 stores 512 the adjusted social proximity score. In one embodiment, the digital magazine server 140 uses the adjusted social proximity score to recommend content items to its users or provide relevant search results to its users or otherwise uses the social proximity score. For example, two digital magazine server users with at least a threshold social proximity score to each other may be determined to share common interests. Accordingly, using the social proximity score to determine recommendations allows the digital magazine server 140 to present the users with content items likely to interest the users. As another example, the digital magazine server 140 ranks search results presented to a digital magazine sever user based at least in part on social proximity scores between the digital magazine server user and other digital magazine server users that interacted with content items in the search results.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for determining social proximity between users of an online system, the method comprising:
    accessing a profile of a user of the online system maintained by each of a plurality of social networking systems, each profile specifying a first plurality of additional users of a social networking system connected to the user via the social networking system;
    identifying a user of the first plurality of additional users of an identified social networking system;
    identifying a second plurality of additional users of the identified social networking system connected to both the user of the online system via the identified social networking system and to the identified user of the first plurality of additional users;
    generating a social proximity score based at least in part on a number of users in the second plurality of additional users connected to the identified user of the first plurality of additional users, the social proximity score indicating a relative social proximity of the user of the online system to the identified user of the first plurality of additional users; and
    recommending a content item to the user of the online system based at least in part on an interaction of the identified user of the first plurality of additional users with the content item and the generated social proximity score.

2. The method of claim 1, wherein recommending the content item to the user of the online system based at least in part on an interaction of the identified user of the first plurality of additional users with the content item and the generated social proximity score comprises:
    recommending the content item to the identified user of the online system if the generated social proximity score has at least a threshold value.

3. The method of claim 1, further comprising:
    monitoring an interaction of the identified user of the first plurality of additional users with respect to a content item in the online system; and
    recommending the content item to the user of the online system based at least in part on the generated social proximity score.

4. The method of claim 3, wherein recommending the content item to the user of the online system based at least in part on an interaction of the identified user of the first plurality of additional users with the content item and the generated social proximity score comprises:
    recommending the content item to the user of the online system if the generated social proximity score has at least a threshold value.

5. The method of claim 1, wherein generating the social proximity score based at least in part on the identified second plurality of additional users connected to the identified user of the first plurality of additional users comprises:
    determining a number of users of the identified social networking system connected to the user of the online system via the identified social networking system;
    determining a ratio of a number of the identified second plurality of additional users connected to both the user of the online system and to the identified user of the first plurality of additional users to the number of users of the identified social networking system connected to the user of the online system.

6. The method of claim 1, wherein generating the social proximity score based at least in part on the identified second plurality of additional users connected to the identified user of the first plurality of additional users comprises:
    determining a number of the first plurality of additional users of the identified social networking system connected to the user of the online system;
    determining a number of additional users of the identified social networking system connected to the identified user of the first plurality of additional users;
    determining a weighted average of the number of additional users of the identified social networking system connected to the user of the online system and the number of additional users of the identified social networking system connected to the identified user of the first plurality of additional users; and
    determining a ratio of a number of the identified second plurality of additional users connected to both the user of the online system and to the identified user of the first plurality of additional users to the weighted average.

7. The method of claim 1, further comprising:
    adjusting the social proximity score based on a directionality of a connection between the user of the online system and the identified user of the first plurality of additional users, wherein a social proximity score for a bidirectional connection is greater than a social proximity score for a unidirectional connection.

8. The method of claim 1, wherein generating the social proximity score comprises:
    identifying a group maintained by the identified social networking system including the identified user of the first plurality of additional users based on a profile of the user of the online system maintained by the identified social networking system; and
    adjusting the social proximity score based on at least one of a name of the group and a set of social networking system users in the group.

9. The method of claim 8, wherein adjusting the social proximity score based on the name of the group comprises:
    selecting a class of the group from a plurality of classes of groups based at least in part on the name of the group, each class of groups associated with a distribution of social proximity scores for users within the group; and
    normalizing the social proximity score to the distribution of the group.

10. The method of claim 1, further comprising:
- identifying a third plurality of users of a second social networking system connected to both the user of the online system and to the identified user of the first plurality of additional users through the second social networking system;
- wherein generating the social proximity score further comprises generating the social proximity score based on the identified third plurality of additional users of the second social networking system connected to both the user of the online system and to the identified user of the first plurality of additional users through the second social networking system.

11. A computer program product for determining social proximity between users of an online system, the computer program product comprising a non-transitory computer-readable storage medium containing computer program code for:
- accessing a profile of a user of the online system maintained by each of a plurality of social networking systems, each profile specifying a first plurality of additional users of a social networking system connected to the user via the social networking system;
- identifying a user of the first plurality of additional users of an identified social networking system;
- identifying a second plurality of additional users of the identified social networking system connected to both the user of the online system via the identified social networking system and to the identified user of the first plurality of additional users;
- generating a social proximity score based at least in part on a number of users in the second plurality of additional users connected to the identified user of the first plurality of additional users, the social proximity score indicating a relative social proximity of the user of the online system to the identified user of the first plurality of additional users; and
- recommending a content item to the user of the online system based at least in part on an interaction of the identified user of the first plurality of additional users with the content item and the generated social proximity score.

12. The computer program product of claim 11, further comprising computer program code for:
- monitoring an interaction of the user of the online system with respect to a content item in the online system; and
- recommending the content item to the identified user of the first plurality of additional users based at least in part on the generated social proximity score.

13. The computer program product of claim 11, further comprising computer program code for:
- monitoring an interaction of the identified user of the first plurality of additional users with respect to a content item in the online system; and
- recommending the content item to the user of the online system based at least in part on the generated social proximity score.

14. The computer program product of claim 11, further comprising computer program code for:
- receiving a search query from the user of the online system; and
- ranking search results for the search query based at least in part on interactions of the identified user with one or more of the search results and the generated social proximity score.

15. The computer program product of claim 11, wherein generating the social proximity score based at least in part on the identified first plurality of additional users of the identified social networking system connected to both the user of the online system and to the identified user of the identified social networking system through the identified social networking system comprises:
- determining a number of users of the identified social networking system connected to the user of the online system via the identified social networking system;
- determining a ratio of a number of users in the identified first plurality of additional users of the identified social networking system connected to both the user of the online system and to the identified user of the identified social networking system to the number of users of the identified social networking system connected to the user of the online system.

16. The computer program product of claim 11, wherein generating the social proximity score based at least in part on the identified second plurality of additional users connected to the identified user of the first plurality of additional users comprises:
- determining a number of the first plurality of additional users of the identified social networking system connected to the user of the online system;
- determining a number of additional users of the identified social networking system connected to the identified user of the first plurality of additional users;
- determining a weighted average of the number of additional users of the identified social networking system connected to the user of the online system and the number of additional users of the identified social networking system connected to the identified user of the first plurality of additional users; and
- determining a ratio of a number of the identified second plurality of additional users connected to both the user of the online system and to the identified user of the first plurality of additional users to the weighted average.

17. The computer program product of claim 11, wherein generating the social proximity score comprises:
- identifying a group maintained by the identified social networking system including the identified user of the first plurality of additional users based on a profile of the user of the online system maintained by the identified social networking system; and
- adjusting the social proximity score based on at least one of a name of the group and a set of social networking system users in the group.

18. The computer program product of claim 17, wherein adjusting the social proximity score based on the name of the group and a set of social networking system users in the group comprises:
- selecting a class of group from a plurality of classes of groups based at least in part on the name of the group, each class of groups associated with a distribution of social proximity scores for users within the group; and
- normalizing the social proximity score to the distribution of the group.

19. The computer program product of claim 11, further comprising computer program code for:
- identifying a third plurality of additional users of a second social networking system connected to both the user of the online system and to the identified user of the first plurality of additional users through the second social networking system;
- wherein generating the social proximity score further comprises generating the social proximity score based on the identified third plurality of additional users of the second social networking system connected to both the user of the online system and to the identified user of the identified first plurality of additional users through the second social networking system.

20. A method for determining social proximity between two users of an online system, the method comprising:

accessing a profile of a user of the online system maintained by each of a plurality of social networking systems, each profile specifying a plurality of additional users of an identified social networking system connected to the user via the corresponding social networking system;

identifying for a user of the identified social networking system, a set of additional users of one or more of the social networking systems connected to the user of the identified social networking system and connected to the user of the online system via at least one of the plurality of social networking systems;

generating a social proximity score between the user of the online system and the user of the identified social networking system based at least in part on the identified set of additional users connected to the user of the social networking system and connected to the user of the online system via at least one of the plurality of social networking systems, the social proximity score indicating a relative social proximity of the user of the online system to the user of the identified social networking system; and recommending a content item to the user of the online system based at least in part on an interaction of the identified user of the identified social networking system with the content item and the generated social proximity score.

* * * * *